US008574380B2

(12) United States Patent
Gong et al.

(10) Patent No.: US 8,574,380 B2
(45) Date of Patent: Nov. 5, 2013

(54) COMPOSITE MAGNETIC MATERIAL AND METHOD OF PREPARING THE SAME

(75) Inventors: Qing Gong, Shenzhen (CN); Xin Du, Shenzhen (CN); Xiaofeng Cheng, Shenzhen (CN)

(73) Assignee: BYD Company Limited (CN)

( * ) Notice: Subject to any disclaimer, the term of this patent is extended or adjusted under 35 U.S.C. 154(b) by 0 days.

(21) Appl. No.: 13/256,418

(22) PCT Filed: Mar. 26, 2010

(86) PCT No.: PCT/CN2010/071368
§ 371 (c)(1),
(2), (4) Date: Sep. 13, 2011

(87) PCT Pub. No.: WO2010/111933
PCT Pub. Date: Oct. 7, 2010

(65) Prior Publication Data
US 2012/0007014 A1    Jan. 12, 2012

(30) Foreign Application Priority Data
Mar. 31, 2009    (CN) .......................... 2009 1 0106263

(51) Int. Cl.
*H01F 1/057*    (2006.01)
(52) U.S. Cl.
USPC ............. 148/302; 148/100; 148/303; 75/244; 419/12
(58) Field of Classification Search
USPC ............ 148/100–103, 302–303, 307; 419/12; 75/244
See application file for complete search history.

(56) References Cited

U.S. PATENT DOCUMENTS

| | | | |
|---|---|---|---|
| 4,919,732 A | 4/1990 | Yang et al. | |
| 5,223,047 A | 6/1993 | Endoh et al. | |
| 6,296,720 B1 | 10/2001 | Yamamoto et al. | |
| 6,302,972 B1 | 10/2001 | Hirosawa et al. | |
| 6,319,336 B1 | 11/2001 | Kamada et al. | |
| 2003/0213534 A1 | 11/2003 | Arai et al. | |
| 2004/0020569 A1 | 2/2004 | Kanekiyo et al. | |
| 2005/0040923 A1* | 2/2005 | Miyoshi et al. | 335/302 |
| 2006/0005898 A1 | 1/2006 | Liu et al. | |
| 2006/0096669 A1* | 5/2006 | Ono et al. | 148/105 |
| 2006/0137767 A1 | 6/2006 | Yamamoto et al. | |
| 2007/0131309 A1* | 6/2007 | Shigemoto et al. | 148/101 |
| 2008/0017277 A1 | 1/2008 | Fujimori et al. | |
| 2009/0129966 A1 | 5/2009 | Kanekiyo et al. | |
| 2009/0274571 A1 | 11/2009 | Du et al. | |
| 2011/0062372 A1 | 3/2011 | Gong et al. | |
| 2012/0058003 A1 | 3/2012 | Gong et al. | |

FOREIGN PATENT DOCUMENTS

| | | |
|---|---|---|
| CN | 1210344 A | 3/1999 |
| CN | 1688000 A | 10/2005 |
| CN | 101299370 A | 11/2008 |
| WO | WO 2010/111933 A1 | 10/2010 |
| WO | WO 2010135958 A1 | 12/2010 |

OTHER PUBLICATIONS

Patent Cooperation Treaty, PCT International Search Report Issued in Connection with International Application No. PCT/CN2010/071368; Jul. 1, 2010; 5 pages; China.
Patent Cooperation Treaty, PCT Written Opinion of the International Searching Authority Issued in Connection with International Application No. PCT/CN2010/071368; Jul. 1, 2010; 5 pages; China.
ASM Materials Engineering Dictionary; Dec. 1992; p. 20.
Abstract Translation of CN1210344A; Mar. 10, 1999; 1 page.
Abstract Translation of CN1688000A; Oct. 26, 2006; 1 page.
Patent Cooperation Treaty, PCT International Search Report issued in Connection with International Application No. PCT/CN2010/072854: Aug. 26, 2010; 5 pages; China.
Patent Cooperation Treaty,PCT Written Opinion of the International Searching Authority Issued in Connection with Application No. PCT/CN2010/072854;Aug. 26, 2010;4 pgs; China.
U.S. Patent and Trademark Office; Restriction Requirement Issued Against U.S. Appl. No. 12/422,385; Jun. 9, 2011; 6 pages; U.S.A.
U.S. Patent and Trademark Office; Non-Final Office Action Issued Against U.S. Appl. No. 12/422,385: Sep. 9, 2011; 7 pages; U.S.A.
U.S. Patent and Trademar Office; Final Office Action Issued Against U.S. Appl. No. 12/422,385; Mar. 6, 2012; 9 pages; U.S.A.
U.S. Patent and Trademark Office; Restriction Requirement Issued Against U.S. Appl. No. 12/860,575; Jun. 4, 2012; 7 pages; U.S.A.
U.S. Patent and Trademark Office; Non-Final Office Action Issued Against U.S. Appl. No. 12/860,575; Aug. 16, 2012; 8 pages; U.S.A.

* cited by examiner

*Primary Examiner* — Roy King
*Assistant Examiner* — Timothy Haug
(74) *Attorney, Agent, or Firm* — Greenberg Traurig, LLP

(57) ABSTRACT

The present invention discloses a composite magnetic material. The composite magnetic material may comprise an Nd—Fe—B alloy and a Fe-based soft magnetic alloy having the general formula of $Fe_{100-x-y-z-a}A_xR_aSi_yB_z$. A may be at least one element selected from Cu and Au. R may be at least one element selected from the group consisting of Ti, Zr, Hf, Mo, Nb, Ta, W and V. And the x, a, y, and z may satisfy: $0 \leq x \leq 3$, $0 \leq a \leq 10$, $0 \leq y \leq 20$ and $2 \leq z \leq 25$. The present invention further discloses a method of preparing the composite magnetic material as described above. According to the present invention, the composite magnetic material may have an enhanced magnetic energy product and residual magnetism respectively.

11 Claims, No Drawings

COMPOSITE MAGNETIC MATERIAL AND METHOD OF PREPARING THE SAME

CROSS-REFERENCE TO RELATED APPLICATION

This patent application is a §371 national stage patent application based on International Patent Application No. PCT/CN2010/071368, filed on Mar. 26, 2010, entitled "COMPOSITE MAGNETIC MATERIAL AND METHOD OF PREPARING THE SAME," which claims priority to Chinese Patent Application Number 200910106263.X, filed on Mar. 31, 2009, which are all incorporated herein by reference in their entirety.

FIELD OF THE INVENTION

The present invention relates to the field of composite material, more particularly to a composite magnetic material and a method of preparing the same.

BACKGROUND OF THE INVENTION

Because of its magnetic properties, low cost and ample reserves, Nd—Fe—B composite magnets are widely used in vehicles, computers, electronics, mechanical and medical devices, to name a few. In addition, because of its performance to price ratio, Nd—Fe—B materials have been favored to produce magnetic devices with high efficiency, small volume and light mass. However, Nd—Fe—B materials are also known to have poor coercivity and mechanical properties, thereby limiting its applications to some extent.

The polymer-bonding method is usually used for preparing a permanent magnetic material. It is easy to press and form a blank, but the polymer and other additives have different structures compared with Nd—Fe—B magnets, which lead to poor mechanical properties of the Nd—Fe—B composite magnets.

SUMMARY OF THE INVENTION

In view thereof, the present invention is directed to solve at least one of the existing problems in the art. Accordingly, a composite magnetic material may be provided, which may overcome shortcomings such as low magnetic energy product or low residual magnetism in the art.

According to an embodiment of the invention, a composite magnetic material may be disclosed, which may comprise an Nd—Fe—B alloy and a nano Fe-based soft magnetic alloy having the general formula of $Fe_{100-x-y-z-a}A_xR_aSi_yB_z$. A may be at least one element selected from Cu and Au. R may be at least one element selected from the group consisting of Ti, Zr, Hf, Mo, Nb, Ta, W and V. And the x, a, y and z may satisfy: $0 \leq x \leq 3$, $0 \leq a \leq 10$, $0 \leq y \leq 20$ and $2 \leq z \leq 25$. The amount of nano Fe-based soft magnetic alloy may range from about 0.01% to about 5% of the Nd—Fe—B alloy by weight.

According to an embodiment of the invention, the Nd—Fe—B alloy may have the general formula of $Nd_aR'_bFe_{100-a'-b-c-d}M_cB_d$. According to an embodiment of the invention, R' may be at least one element selected from the group consisting of Pr, Dy and Tb, M may be at least one element selected from the group consisting of Nb, Co, Ga, Zr, Al, Cu and Ti, and the a', b, c and d may satisfy: $10 \leq a' \leq 20$, $0 \leq b \leq 8$, $0 \leq c \leq 6$ and $5 \leq d \leq 7$.

Further, a method of preparing a permanent magnetic material as described above may be provided. The method may comprise the following steps: mixing an Nd—Fe—B alloy and a nano Fe-based soft magnetic alloy to form a mixture, pressing the mixture in a magnetic field to form a blank, or parison formation, sintering the blank under a first temperature, and tempering the blank under a second temperature. According to an embodiment of the invention, the sintering and tempering steps may be occurred under vacuum. According to an embodiment of the invention, the sintering and tempering steps may be occurred under an inert gas atmosphere.

According to an embodiment, the average particle diameter of the nano Fe-based soft magnetic alloy may range from about 2 nm to about 1000 nm. According to an embodiment, the average particle diameter of the nano Fe-based soft magnetic alloy may range from about 2 nm to about 100 nm.

According to an embodiment, the pressing step may have an intensity ranging from about 1.2 Tesla (T) to about 2.0 T, a pressure ranging from about 10 Megawatts (MPa) to about 200 MPa, and a period ranging from about 10 seconds to about 60 seconds. According to an embodiment, the first temperature may range from about 1030° C. to about 1120° C. for a period ranging from about 2 hours to about 5 hours, while the second temperature may be from about 460° C. to about 920° C. for a period of from about 1.5 hours to about 8 hours.

According to the present invention, the composite magnetic material may have a remarkably improved residual magnetism, coercive force and magnetic energy product, especially for the residual magnetism and the magnetic energy product. Further, the mechanical properties thereof are ameliorated accordingly.

Other variations, embodiments and features of the presently disclosed permanent magnetic materials will become evident from the following detailed description, drawings and claims.

DETAILED DESCRIPTION OF THE EMBODIMENTS OF THE INVENTION

It will be appreciated by those of ordinary skill in the art that the permanent magnetic materials can be embodied in other specific forms without departing from the spirit or essential character thereof. The presently disclosed embodiments may be therefore considered in all respects to be illustrative and not restrictive.

One embodiment of the present disclosure may disclose a composite magnetic material comprising an Nd—Fe—B (neodymium-iron-boron) alloy and a nano Fe-based soft magnetic alloy having the general formula of $Fe_{100-x-y-z-a}A_xR_aSi_yB_z$. A may be at least one element selected from Cu and Au. R may be at least one element selected from the group consisting of Ti, Zr, Hf, Mo, Nb, Ta, W and V. And x, a, y and z may satisfy: $0 \leq x \leq 3$, $0 \leq a \leq 10$, $0 \leq y \leq 20$ and $2 \leq z \leq 25$.

According to an embodiment of the invention, the Nd—Fe—B alloy may have the following general formula: $Nd_aR'_bFe_{100-a'-b-c-d}M_cB_d$. In this embodiment, the R' may be at least one element selected from the group consisting of Pr, Dy and Tb, the M may be at least one element selected from group consisting of Nb, Co, Ga, Zr, Al, Cu and Ti. And a', b, c and d may satisfy: $10 \leq a' \leq 20$, $0 \leq b \leq 8$, $0 \leq c \leq 6$ and $5 \leq d \leq 7$.

According to an embodiment of the invention, the amount of nano Fe-based soft magnetic alloy may range from about 0.01% to about 5% of the Nd—Fe—B alloy by weight.

The adopted nano Fe-based soft magnetic alloy in the embodiment of the present invention may have soft magnetic property, having the general structural formula as mentioned above.

Further, one embodiment of the present disclosure may disclose a method of preparing a composite magnetic material. The method may comprise: mixing an Nd—Fe—B alloy and a nano Fe-based soft magnetic alloy to form a mixture, pressing the mixture in a magnetic field to form a composition, or a blank, sintering the blank under a first temperature, and tempering the blank under a second temperature.

According to an embodiment, the nano Fe-based soft magnetic alloy may be uniformly dispersed within the Nd—Fe—B alloy, the nano Fe-based soft magnetic alloy having average particle diameters ranging from about 2 nm to about 1000 nm. According to an embodiment, the boride may have average particle diameters of from about 2 nm to about 100 nm. According to an embodiment, the amount of nano Fe-based soft magnetic alloy may be from about 0.01% to about 5% of the Nd—Fe—B alloy by weight.

According to an embodiment, the Nd—Fe—B alloy may have the following general formula: $Nd_aR'_bFe_{100-a'-b-c-d}M_cB_d$. In the embodiment, the R' may be at least one element selected from the group consisting of Pr, Dy and Tb. The M may be at least one element selected from a group consisting of Nb, Co, Ga, Zr, Al, Cu and Ti, and a', b, c and d may satisfy: $10 \le a' \le 20$, $0 \le b \le 8$, $0 \le c \le 6$ and $5 \le d \le 7$. The Nd—Fe—B alloy may have an average particle diameter ranging from about 2 microns to about 10 microns.

According to an embodiment, the step of pressing the mixture in a magnetic field may adopt those commonly used in the art, such as those disclosed in Chinese Patent Application CN20081006196.3, the entire content is hereby incorporated for reference. The intensity thereof may range from about 1.2 T to about 2.0 T, and the pressure may range from about 10 MPa to about 20 MPa.

According to an embodiment, the sintering and tempering steps may be occurred under vacuum having a vacuum degree of about $1.0 \times 10^{-1}$ Pa to about $1.0 \times 10^{-5}$ Pa. According to an embodiment, the sintering and tempering steps may be occurred under an inert gas atmosphere. According to an embodiment, the inert gas may include at least one member selected from a group consisting of nitrogen, helium, argon, neon, krypton and xenon.

According to an embodiment, the first temperature may range from about 1030° C. to about 1120° C. for a period ranging from about 2 hours to about 5 hours, while the second temperature may range from about 460° C. to about 920° C. for a period ranging from about 1.5 hours to about 8 hours.

The concrete steps of the method will be described in detail as follows:

(1) According to an embodiment of the invention, the Nd—Fe—B alloy may be crushed and grounded to form a powder. The hydrogen-induced cracking or mechanical crushing may be adopted for crushing. According to an embodiment of the invention, jet milling may be utilized to produce powders with average particle diameters ranging from about 2 microns to about 10 microns.

According to an embodiment of the invention, the Nd—Fe—B alloy may be an alloy ingot or a strip casting alloy. According to an embodiment of the invention, the Nd—Fe—B alloy may be commercially obtained. According to an embodiment of the invention, the Nd—Fe—B alloy may be produced by casting or strip casting processes. According to an embodiment of the invention, the Nd—Fe—B alloy may have the following general formula: $Nd_aR'_bFe_{100-a'-b-c-d}M_cB_d$ where the R' may be at least one element selected from the group consisting of Pr, Dy and Tb. The M may be at least one element selected from the group consisting of Nb, Co, Ga, Zr, Al, Cu and Ti, and $10 \le a' \le 20$, $0 \le b \le 8$, $0 \le c \le 6$, and $5 \le d \le 7$.

According to an embodiment, the casting process may comprise: casting a smelted alloy molten in a water-cooled, copper mold. The Nd—Fe—B alloy ingot may have a columnar, crystal structure, where the columnar crystals may be separated by Nd-rich phase layers. In these instances, the distance between the two Nd-rich phase layers may range from about 100 microns to about 1500 microns.

According to an embodiment, the strip casting process may comprise: pouring a smelted alloy molten on a copper roller surface. In one example, the copper roller surface may have a rotational linear velocity varying from about 1 meter per second to about 2 meters per second. The molten alloy may be cooled to form flakes in different breadths with thicknesses ranging from about 0.2 mm to about 0.5 mm. According to an embodiment, the columnar crystals in the flakes may have breadths ranging from about 5 microns to about 25 microns.

According to an embodiment, hydrogen-induced cracking may comprise: placing an Nd—Fe—B alloy in a stainless steel case, filling the case with high purity hydrogen after vacuumizing, and maintaining at an atmospheric pressure. After about 20 minutes to about 30 minutes, the alloy may blow out because of hydrogen absorption thereof to produce a hydride. According to an embodiment, the case may be vacuumized for dehydrogenation for about 2 hours to about 10 hours under a temperature ranging from about 400° C. to about 600° C.

According to an embodiment of the invention, mechanical crushing may comprise rough crushing in a jaw crusher, followed by mechanical crushing in a fine crusher. According to an embodiment of the invention, jet milling may comprise accelerating powder grains to supersonic speed in air so that the grains are collided with each other and fall to pieces.

(2) The Nd—Fe—B alloy and the nano Fe-based soft magnetic alloy may be mixed using a mixer to obtain a powder blank. The amount of nano Fe-based soft magnetic alloy may range from about 0.01% to about 5% of the Nd—Fe—B alloy by weight. According to an embodiment of the invention, the nano Fe-based soft magnetic alloy may be processed in advance by dispersion treatment. According to an embodiment of the invention, the nano Fe-based soft magnetic alloy may have the general formula of $Fe_{100-x-y-z-a}A_xR_aSi_xB_z$. A may be at least one element selected from Cu and Au. R may be at least one element selected from the group consisting of Ti, Zr, Hf, Mo, Nb, Ta, W and V. And the x, a, y and z may satisfy: $0 \le x \le 3$, $0 \le a \le 10$, $0 \le y \le 20$ and $2 \le z \le 25$. According to an embodiment of the invention, the nano Fe-based soft magnetic alloy may have an average particle diameter ranging from about 2 nm to about 1000 nm.

According to an embodiment of the invention, the mixture of Nd—Fe—B alloy and nano Fe-based soft magnetic alloy may further include an antioxidant and a lubricant. According to an embodiment of the invention, the amount of antioxidant may be about 0.01% to about 5% of the alloy by weight, and the amount of lubricant may be about 0% to about 5% of the alloy by weight. According to an embodiment of the invention, the antioxidant may include at least one member selected from the group consisting of polyethylene oxide alkyl ether, polyethylene oxide single fatty ester and polyethylene oxide alkenyl ether.

According to an embodiment of the invention, the lubricant may include at least one member selected from a group consisting of gasoline, oleic acid, stearic acid, polyhydric alcohol, polyethylene glycol, sorbitan and stearin.

Further, the mixing process may be that commonly used in the art, and the mixture may be evenly mixed in a mixer.

(3) The mixture may be pressed in a magnetic field to form a blank or parsion formation. According to an embodiment, the pressing process may comprise: pressing the mixture in a closed glove box within a magnetic field. According to an embodiment, the magnetic field may have an intensity ranging from about 1.2 T to about 2.0 T and the blank may be pressed under a static pressure ranging from about 10 MPa to about 200 MPa for about 10 seconds to about 60 seconds. Further increasing of the magnetic field may further enhance the orientation degree of the magnetic powder. The blank is formed within a completely hermetic glove box, so that the magnetic powder is isolated from the air, obviating fire raised by the heat due to magnetic oxidization on one aspect, and reducing oxygen content in the final magnetic body.

(4) The blank may be sintered under a first temperature, and tempered under a second temperature. According to an embodiment, the sintering and tempering steps may occur under vacuum respectively. According to an embodiment, the sintering and tempering may occur under an inert gas filled atmosphere. According to an embodiment, the inert gas may include at least one member selected from the group consisting of nitrogen, helium, argon, neon, krypton and xenon. According to an embodiment, the mixture may be sintered under a temperature ranging from about 1030° C. to about 1120° C. for a period of about 2 hours to about 4 hours. According to an embodiment, the mixture may be tempered under a temperature ranging from about 500° C. to about 920° C. for a period of about 2 hours to about 8 hours. According to an embodiment, the mixture may be tempered in two steps, the first tempering under a temperature ranging from about 800° C. to about 920° C. for a period of about 1 hour to about 3 hours followed by a second tempering under a temperature ranging from about 500° C. to about 650° C. for a period of about 2 hours to about 4 hours. The magnetic performance of the composite magnetic material may be further enhanced by the secondary tempering.

The following provides additional details on some embodiments of the present disclosure.

EXAMPLE 1

(1) An Nd—Fe—B alloy may be made by strip casting with a rotational linear velocity of a copper roller surface at about 1.5 meters per second. The strip casting alloy may have a thickness of about 0.3 mm with the formula of $Nd_{3.4}(Pr_{2.7}Dy_{3.1})Fe_{77.3}(Co_{1.7}Al_{5.5}Cu_{0.2}Zr_{0.1}Ga_{0.1})B_{5.9}$.

(2) The Nd—Fe—B alloy was crushed by hydrogen-induced cracking. And hydrogen was absorbed to saturation under room temperature. Next, hydrogen crushed powder was formed by dehydrogenating for 6 hours under a temperature of 550° C. The alloy was milled to produce a powder with an average particle diameter of about 5 microns by jet milling in a nitrogen-filled atmosphere.

(3) A nano Fe-based soft magnetic alloy and an antioxidant was added to the powder. The nano Fe-based soft magnetic alloy had the general formula of $Fe_{73.5}Nb_{3.0}Cu_{1.0}Si_{13.5}B_{9.0}$, it was about 0.02% of the Nd—Fe—B alloy by weight and had an average particle diameter of about 20 nm. The antioxidant was polyethylene oxide allyl ether, which was about 3% of the Nd—Fe—B alloy by weight. The blank was mixed by adding gasoline, which was about 3% of the Nd—Fe—B alloy by weight.

(4) The powder after mixture was pressed by a forming press in a closed glove box under nitrogen gas in a magnetic field. The intensity of the oriented magnetic field was about 1.6 T, the pressure was about 100 MPa, and the iso-static pressing time was about 30 seconds.

(5) The blank after pressing was sintered in a vacuum sintering furnace in an atmospheric pressure of $2\times10^{-2}$ Pa, under a sintering temperature of about 1090° C. for about 4 hours. The blank was subsequently tempered under a temperature of about 900° C. for about 2 hours followed by tempering under a temperature of about 550° C. for about 3 hours.

The composite magnetic material was designated as T1.

REFERENCE 1

The sample was substantially similar in all respects with those in EXAMPLE 1 except that the Nd—Fe—B alloy did not comprise nano Fe-based soft magnetic alloy powder.

The composite magnetic material was designated as TC1.

REFERENCE 2

The Nd—Fe—B alloy and the nano Fe-based soft magnetic alloy were used substantially similar to that of EXAMPLE 1 to form the mixed alloy power. The mixed alloy power as provided in the EXAMPLE 1 was further processed by bonding. A polymer bonding method was used for forming the blank: firstly the mixed alloy powder was encapsulated by silane, and then a bonding agent having epoxy resin of 2% by weight was mixed in the alloy mixture, and the blank was pressed mechanically to form a composite magnetic material with a density of about 6.27 grams per cubic centimeter (g/cm³).

The composite magnetic material was designated as TC2.

EXAMPLE 2

The sample was substantially the same with that of EXAMPLE 1 with the exception that the nano Fe-based soft magnetic alloy of $Fe_{73.5}Nb_{3.0}Cu_{1.0}Si_{13.5}B_{9.0}$ was employed having an average particle diameter of about 100 nm.

The composite magnetic material was designated as T2.

EXAMPLE 3

The sample was substantially the same with that of EXAMPLE 1 with the exception that the amount of $Fe_{73.5}Nb_{3.0}Cu_{1.0}Si_{13.5}B_{9.0}$ was about 5% of the Nd—Fe—B alloy by weight.

The composite magnetic material was designated as T3.

EXAMPLE 4

The sample was substantially the same with that of EXAMPLE 1 with the exception that: $Fe_{70.5}Nb_{3.0}Cu_{1.0}Si_{15.5}B_{10.0}$ was incorporated as the nano Fe-based soft magnetic alloy instead of $Fe_{73.5}Nb_{3.0}Cu_{1.0}Si_{13.5}B_{9.0}$; and the amount of $Fe_{70.5}Nb_{3.0}Cu_{1.0}Si_{15.5}B_{10.0}$ was about 3% of the Nd—Fe—B alloy by weight.

The composite magnetic material can be was designated as T4.

TESTING

1. Magnetic Property

A curve measurement system NIM200C for permanent magnetic materials developed by China National Institute of Metrology was used for measuring magnetic properties of materials T1-T4, TC1 and TC2 with the results being recorded in Table 1. The magnetic properties tested include residual magnetism (Br) and maximum magnetic energy product (BHmax).

2. Mechanical Property

A universal testing machine CMT5105 distributed by Xin-SanSi Group Company, ShenZhen, Guangdong Province, China was used for measuring mechanical properties of materials T1-T4, TC1 and TC2 with the results being also recorded in Table 1. The mechanical properties tested include coercive force (Hcj) and bending strength (MPa) respectively.

TABLE 1

Magnetic and mechanical properties of materials T1-T4, TC1 and TC2.

| No. | Br (KGs) | Hcj (KOe) | BHmax (MGOe) | Bending Strength (MPa) |
|---|---|---|---|---|
| T1  | 12.24 | 27.65 | 35.70 | 253.52 |
| T2  | 12.13 | 27.02 | 35.16 | 244.48 |
| T3  | 11.87 | 27.36 | 34.11 | 245.77 |
| T4  | 12.09 | 26.80 | 35.03 | 237.48 |
| TC1 | 10.91 | 25.74 | 34.41 | 220.14 |
| TC2 | 6.93  | 9.82  | 10.16 | — |

Based on the results as shown in Table 1, T1 exhibits better coercive force (27.65 kilooersted (KOe) v. 25.74 KOe) and improved bending strength (253.52 MPa v. 220.14 MPa) than its counterpart TC1, which does not have the nano Fe-based soft magnetic alloy. At the same time, the composite magnetic material T1 can maintain comparable magnetic properties (residual magnetism of 12.24 kilogauss (KGs) v. 10.91 KGs for T1 v. TC1; maximum magnetic energy product of 35.70 megaoersted (MGOe) v. 34.41 MGOe for T1 v. TC1). Still further, T1 exhibits much better performance than its counterpart TC2 which was prepared by polymer-bonding. In addition, the composite magnetic material according to the presently disclosed embodiments can also maintain comparable mechanical properties including coercive force and bending strength against the reference samples while keeping magnetic properties including residual magnetism and maximum magnetic energy product substantially invariant.

Although the permanent magnetic materials have been described in detail with reference to several embodiments, additional variations and modifications exist within the scope and spirit as described and defined in the following claims.

What is claimed is:

1. A composite magnetic material, comprising:
    a Nd—Fe—B alloy powder; and
    a nano Fe-based soft magnetic alloy powder, which specified in atomic percentage is:
        $Fe_{100-x-y-z-a}A_xR_aSi_yB_z$, wherein:
    A is at least one element selected from the group consisting of Cu and Au;
    R is at least one element selected from the group consisting of Ti, Zr, Hf, Mo, Nb, Ta, W and V; and wherein $0 \leq x \leq 3$, $0 \leq a \leq 10$, $0 < y \leq 20$ and $2 \leq z \leq 25$.

2. The material according to claim 1, wherein the nano Fe-based soft magnetic alloy is present in an amount ranging from about 0.01% to about 5% of the Nd—Fe—B alloy by weight.

3. The material according to claim 1, wherein the Nd—Fe—B alloy specified in atomic percentage is:
    $Nd_aR'_bFe_{100-a'-b-c-d}M_cB_d$, wherein:
    R' is at least one element selected from the group consisting of Pr, Dy and Tb;
    M is at least one element selected from the group consisting of Nb, Co, Ga, Zr, Al, Cu and Ti; and wherein $10 \leq a' \leq 20$, $0 \leq b \leq 8$, $0 \leq c \leq 6$ and $5 \leq d \leq 7$.

4. A method of preparing a composite magnetic material, the method comprising:
    the composite magnetic material comprising:
        a Nd—Fe—B alloy powder; and a nano Fe-based soft magnetic alloy powder which specified in atomic percentage is:
            $Fe_{100-x-y-z-a}A_xR_aSi_yB_z$, wherein:
        A is at least one element selected from the group consisting of Cu and Au;
        R is at least one element selected from the group consisting of Ti, Zr, Hf, Mo, Nb, Ta, W and V; and wherein $0 \leq x \leq 3$, $0 \leq a \leq 10$, $0 < y \leq 20$ and $2 \leq z \leq 25$;
    mixing the Nd—Fe—B alloy powder and the nano Fe-based soft magnetic alloy powder to form a mixture;
    pressing the mixture in a magnetic field to form a blank;
    sintering the blank under a first temperature; and
    tempering the blank under a second temperature, wherein the sintering and/or tempering steps occur under a first atmosphere.

5. The method according to claim 4, wherein the first atmosphere is either a vacuum atmosphere or inert gas filled atmosphere.

6. The method according to claim 4, wherein the nano Fe-based soft magnetic alloy powder has an average particle diameter ranging from about 2 nm to about 1000 nm.

7. The method according to claim 6, wherein the nano Fe-based soft magnetic alloy powder has an average particle diameter ranging from about 2 nm to about 100 nm.

8. The method according to claim 4, wherein the Nd—Fe—B alloy powder has an average particle diameter ranging from about 2 microns to about 10 microns.

9. The method according to claim 4, wherein a weight ratio of the Nd—Fe—B alloy powder to the nano Fe-based soft magnetic alloy powder ranges from about 1:100000 to about 1:20.

10. The method according to claim 4, wherein the magnetic field has an intensity ranging from about 1.2 T to about 2.0 T, a pressure ranging from about 10 MPa to about 200 MPa, and a period ranging from about 10 seconds to about 60 seconds.

11. The method according to claim 4, wherein the first temperature ranges from about 1030° C. to about 1120° C. for a period ranging from about 2 hours to about 4 hours, and wherein the second temperature ranges from about 460° C. to about 920° C. for a period ranging from about 1.5 hours to about 8 hours.

* * * * *